United States Patent [19]

Goodale et al.

[11] Patent Number: 5,117,870

[45] Date of Patent: Jun. 2, 1992

[54] PINCH VALVE

[75] Inventors: David L. Goodale, Anaheim; Edmund E. Buzza, Fullerton, both of Calif.

[73] Assignee: Beckman Instruments, Inc., Fullerton, Calif.

[21] Appl. No.: 678,825

[22] Filed: Apr. 1, 1991

[51] Int. Cl.⁵ ............................................... F16K 7/06
[52] U.S. Cl. ................................... 137/636.1; 251/7; 251/254; 137/595; 137/624.18
[58] Field of Search .................. 251/4, 6, 7, 9, 251; 251/254; 137/624.16, 624.17, 624.18, 624.19, 624.22, 595, 636, 636.1, 863, 867

[56] References Cited

U.S. PATENT DOCUMENTS

| | | | |
|---|---|---|---|
| 2,231,460 | 8/1938 | Barman | 137/69 |
| 3,425,446 | 2/1969 | McNown | 137/624.16 |
| 3,550,619 | 6/1968 | Halasz | 137/595 |
| 4,230,151 | 10/1980 | Jonsson | 137/595 |
| 4,282,902 | 8/1981 | Haynes | 251/9 X |
| 4,328,834 | 5/1982 | Oates, Sr. et al. | 137/636.1 |
| 4,457,339 | 7/1984 | Juan et al. | 251/7 X |
| 4,491,156 | 1/1985 | Lee, II | 137/595 X |
| 4,508,148 | 4/1985 | Trechsel et al. | 141/147 |
| 4,691,738 | 9/1987 | McCune | 137/595 X |
| 4,694,861 | 9/1987 | Goodale et al. | 137/624.22 X |
| 4,753,270 | 6/1988 | Lawhite et al. | 137/624.18 |
| 4,786,028 | 11/1988 | Hammond | 251/7 X |
| 4,852,551 | 8/1989 | Opie et al. | 137/595 |

Primary Examiner—Martin P. Schwadron
Assistant Examiner—Kevin L. Lee
Attorney, Agent, or Firm—William H. May; Gary T. Hampson; Charles Berman

[57] ABSTRACT

A pinch valve for selectively pinching or releasing a multiple plurality of fluid conduits includes a rotatable single cam as part of a rotor within a stator for locating the fluid conduits. The cam periphery with different lobe surfaces for engaging movable means which is either a plunger or a endless belt which pinch or release multiple fluid conduits. The rotor integrally includes a gear, shaft and flag indicator and is operable by a stepper motor. A backing means about the stator resiliently resists movement.

38 Claims, 4 Drawing Sheets

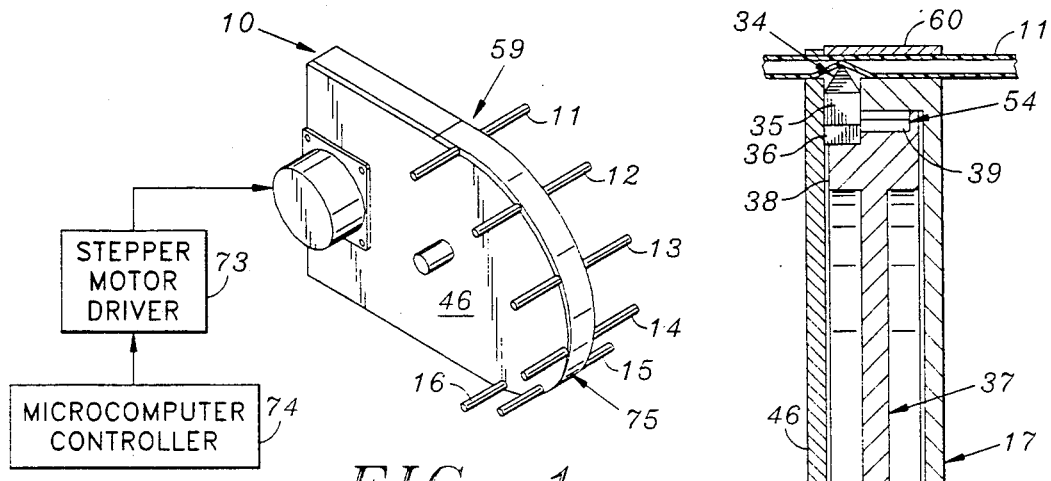
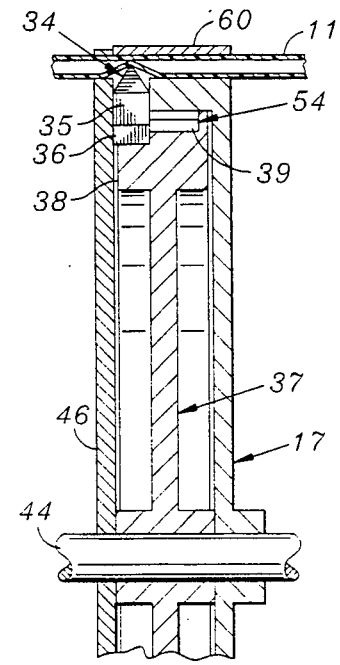
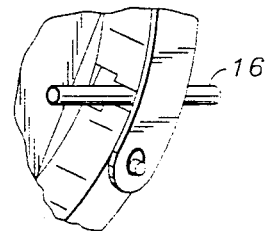
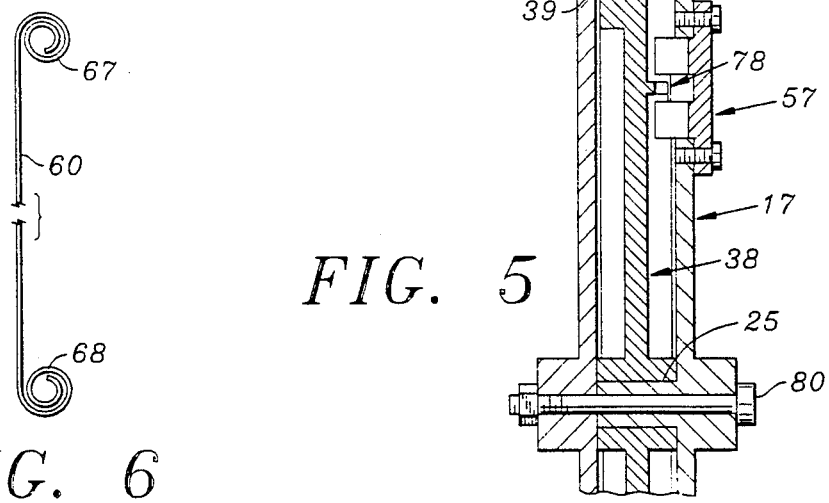
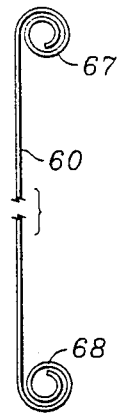
FIG. 1
FIG. 3
FIG. 4
FIG. 5
FIG. 6

PINCH VALVE

BACKGROUND

Effective opening and closing of multiple fluid conduits with a pinch valve is essential in the operation of many clinical analyzers.

This invention relates to a pinch valve device In particular, the invention is directed to a device which is for use in controlling fluid flow through a plurality of fluid conduits.

Rotary pinch valves for selectively pinching and releasing a plurality of fluid conduits for controlling fluid flow are known. In some of these devices, actuators are used for random access of different fluid conduits. Multiple cam mechanisms are used for interacting with the fluid conduits and a high degree of machining and assembling accuracy is necessary to match multiple cam segments to ensure effective operation of the device. Generally, the known pinch valve mechanisms require multiple components besides the multiple cams. Thus a high degree of precision is necessary to ensure effective operation of the valve. High manufacturing costs and relative complexity of the unit are a result.

There is accordingly a need to provide a pinch valve device which is relatively simple in its fabrication and operation with multiple fluid conduits.

SUMMARY

The present invention seeks to fulfill the need by providing a pinch valve with relatively fewer components. A single actuator means in the form of a cam pinches or releases multiple selected fluid conduits.

According to the invention a pinch valve device for selectively pinching or releasing a plurality of flexible fluid conduits comprises a valve body for retaining the flexible fluid conduits. Actuator means is cooperatively located with and movable relative to the valve body to permit selective pinching or releasing of multiple selected conduits.

There is movable means cooperatively located with the actuator means and activated by the actuator means to effect selective pinching or releasing of the multiple selected fluid conduits. Also, a backing means is mounted with the valve body relatively with the fluid conduits such that movement of the backing means is resiliently resisted when pinching is effected.

In a preferred form of the invention, the valve body is a stator and the actuator means is a rotor. The rotor includes preferably a gear operable by a motor, and a cam with a peripheral surface for engaging the movable means and a shaft for location with the stator. The stator includes peripheral slots spaced circumferentially about the outside of the stator and radially spaced into which the fluid conduits are placed.

The single cam of the rotor operates the movable means to activate multiple selected conduits located in the stator.

The invention is further described with reference to the accompanied drawings and description.

DRAWINGS

FIG. 1 is a diagrammatic illustrative view of the housing of the pinch valve together with blocks representing control circuitry for the motor.

FIG. 3 is a partial sectional side view of the housing of the pinch valve in the embodiment of FIG. 2.

FIG. 4 is a partial perspective view of an alternative means of fastening the backing strap.

FIG. 5 is an alternative embodiment in partial sectional view of the valve.

FIG. 6 is a side view of an alternative backing strap with a coil spring integral construction.

DESCRIPTION

Figure 2:
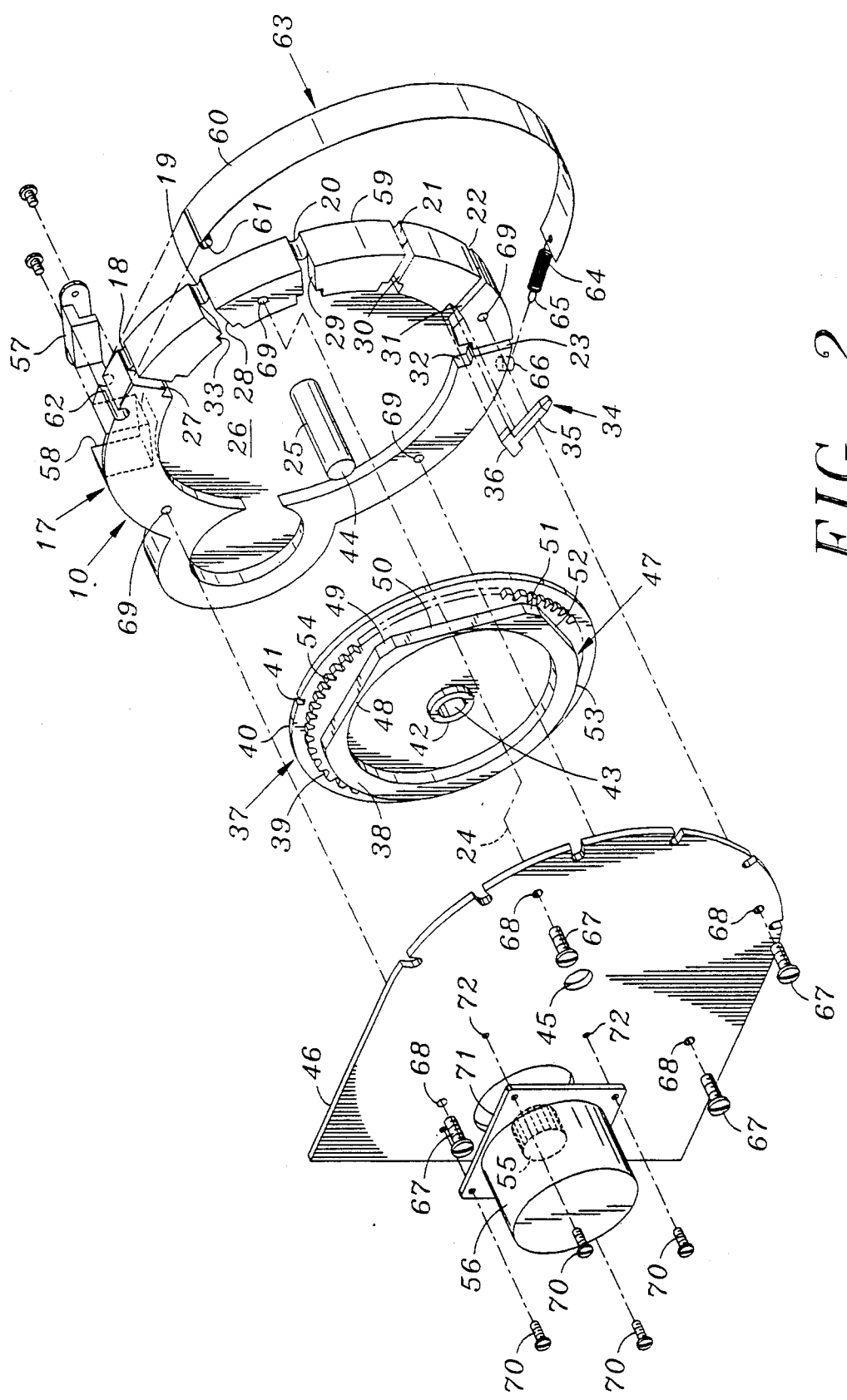
FIG. 2 is an exploded view of the pinch valve.

A pinch valve includes a single cam, stepper motor actuated device which can handle flow to and from multiple tubes connected with one or more cylinder pumps. The device is relatively inexpensive and compact and is configured such that adjustment of the pinch gap to achieve effective pinching after assembly is unnecessary.

A pinch valve selectively pinching or releasing a plurality of flexible fluid conduits includes a valve body 10 for retaining flexible conduits 11, 12, 13, 14, 15 and 16 about the perimeter of the valve body 10. The valve body 10 includes a stator 17 with slots 18, 19, 20, 21, 22 and 23 located peripherally about the housing of the stator 17. The slots 18 through 23 are spaced circumferentially relatively to the axis 24 through the stator 17. The slots 18 through 23 are directed relative to the axis 24. In the embodiment illustrated in FIG. 2, a shaft 25 is directed axially along axis 24 from the central disk region 26 of the stator 17.

The slots 18 through 23 are connected with a housing configuration 27, 28, 29, 30, 31 and 32. The housings 28 through 32 are radially directed relative to axis 24 and circumferentially spaced. The housings 28 through 32 form a substantial T-shaped section with an elongated stem portion and a cross-piece 33, the cross-piece 33 being closer to the central axis 24. In each of the housings 28 through 32, there is located an anvil-shaped plunger 34 which includes a stem 35 and a head 36. The head 36 fits into the cross-piece 33 and the stem 35 fits into the elongated stem portion. The plungers 34 constitute the movable means for interacting with the conduits 11 through 16 located in the slots 18 through 23. As the plungers 34 move radially outwardly to a first radial position projecting at least partly into the slots 18 through 23, the conduits 11 through 16 are pinched. In a second radial position, the plungers are removed at least partly from the housing and the conduits 11 through 16 are released.

Figure 9:
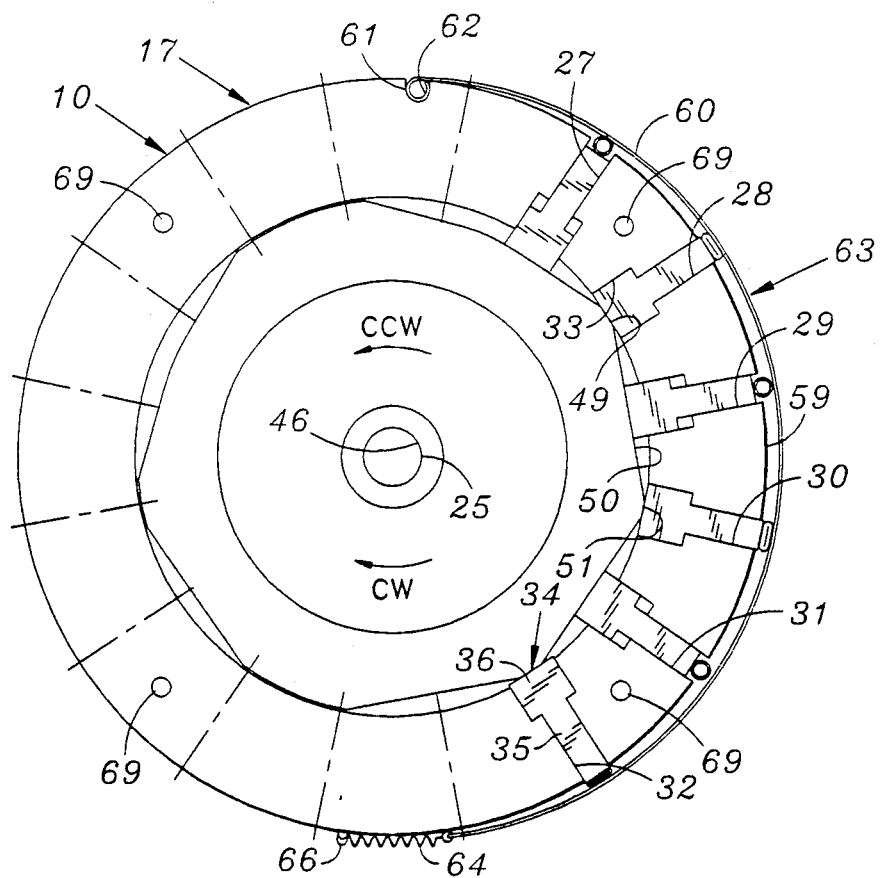
FIG. 9 is a diagrammatic view illustrating the sixteen different positions possible with a single cam and the six fluid conduits.

Also part of the pinch valve is actuator means 37 which is in the form of a rotor and is cooperatively located and movable relative to the valve body 10 thereby to permit selective pinching or releasing of the multiple selected fluid conduits 11 through 16. The pinching is effected by the intermediate movable means which in FIG. 9 is the plunger 34 which cooperates between the actuator means 37 and the valve body 10.

The actuator means 37 is a rotor which has a cam disk 38, a gear disk 39 and a disk 40 including a notched flag element 41. The elements 38, 39 and 40 are circumferential constructions in parallel relationship with each other and form an integral unit. A central hub 42 is provided with an axial aperture 43 through which the shaft 25 passes. In some embodiments, the shaft 25 is integrally molded with the hub 42 and thus, forms part of the integral unit constituted by elements 38, 39 and 40. In such a situation, the shaft 25 will suitably engage with the stator 17 in receiving means on the stator 17. The free end 44 of the shaft 25 would engage with an aperture 45 in a motor mounting plate 46.

The cam 38 provides a peripheral portion 47 divided into 16 circumferential sections. The six fluid conduits 11 through 16 can be operated by means of the cam 38 which interengage with the plungers 34 so that there are in the illustrated embodiment, sixteen different release and pinching positions for each of the six fluid conduits. The conduits can be connected with three pumps, each pump having two ports.

The sixteen positions are identified in part by elements 48 through 53. Other portions of the sixteen elements continue around the circumference of the cam member 38. The portions 48 through 53 form multiple-spaced lobes extending about the periphery of the cam, the lobes being a portion of the periphery of cam 38.

Integrally molded adjacent the cam 38 is the circumferential gear 39 with teeth 54 about the periphery of the gear. The teeth interact with teeth on a pinion 55 driven by a stepper motor 56. In adjacency with the gear 39, there is molded the disk 40 with the flag element 41 for indicating the location of the rotor 37. The flag 41 cooperates with an optical switch 57 which fits within a slot 58 in the outside periphery of the stator 17. More flags 41 can be provided on the disk 40 as required. The interaction of the switch 57 indicates the position of the rotor 37 relative to the stator 17.

Also about an outside face 59 of the stator 17 there is provided a backing means 63 which is in the form of a strap 60. As illustrated in FIG. 2, this strap is made from a thin metal strip and has an engaging formation 61 for location in a receiving slot 62 on the outside of the peripheral surface of the stator 17.

The other side of the strap 60 is connected with a coil spring 64 which engages at its free end 65 with a stud 66. In this manner, the backing means 63 is drawn relatively tightly over the face 59 of the stator 17. The backing means 63 is movable relative to the stator 17 such that when the plungers are extended radially outwardly, the backing means 63 will move outwardly under the pressure. In this manner, the backing material allows for dimensional variations of the cam 38 and the plungers 34 so that the motor 56 will not be overloaded.

The backing means 63 as illustrated in FIG. 2 is a stiff material, namely, a thin metal strip and the movement is effected by the spring 64. In a different embodiment as illustrated in FIG. 6, the movement can be effected by the integral coiled spring ends 67 and 68 of the strap 60. In other cases, the backing means 63 is a compliant material such as plastic, rubber or urethane.

The pinch valve is closed with the motor mounting plate 46. Screws 67 pass through apertures 68 in the motor mounting plate 46 and engage in the apertures 69 in the stator housing. Screws 70 secure the motor 56 through plate 71 into apertures 72 to secure the stepper motor onto the mounting plate 46. The stepper motor 56 is driven by a driver circuit 73 which is operated through a microcomputer controller 74 as shown in FIG. 1.

As illustrated in FIG. 1, a relatively narrow profile side view, about 1 inch in dimension, is provided to the side face 75 of the pinch valve. The side face with the 1 inch is measured in the same direction as the direction of the flow of conduits 11 through 16 located in the pinch valve device. The shaft 25 is pressed onto the stator 17 as illustrated in FIG. 2 or in other cases can be differently secured with the stator 17.

When the optical axis of the switch 57 is aligned with the notch through the flag disk 40, the home position is indicated.

Figure 7:
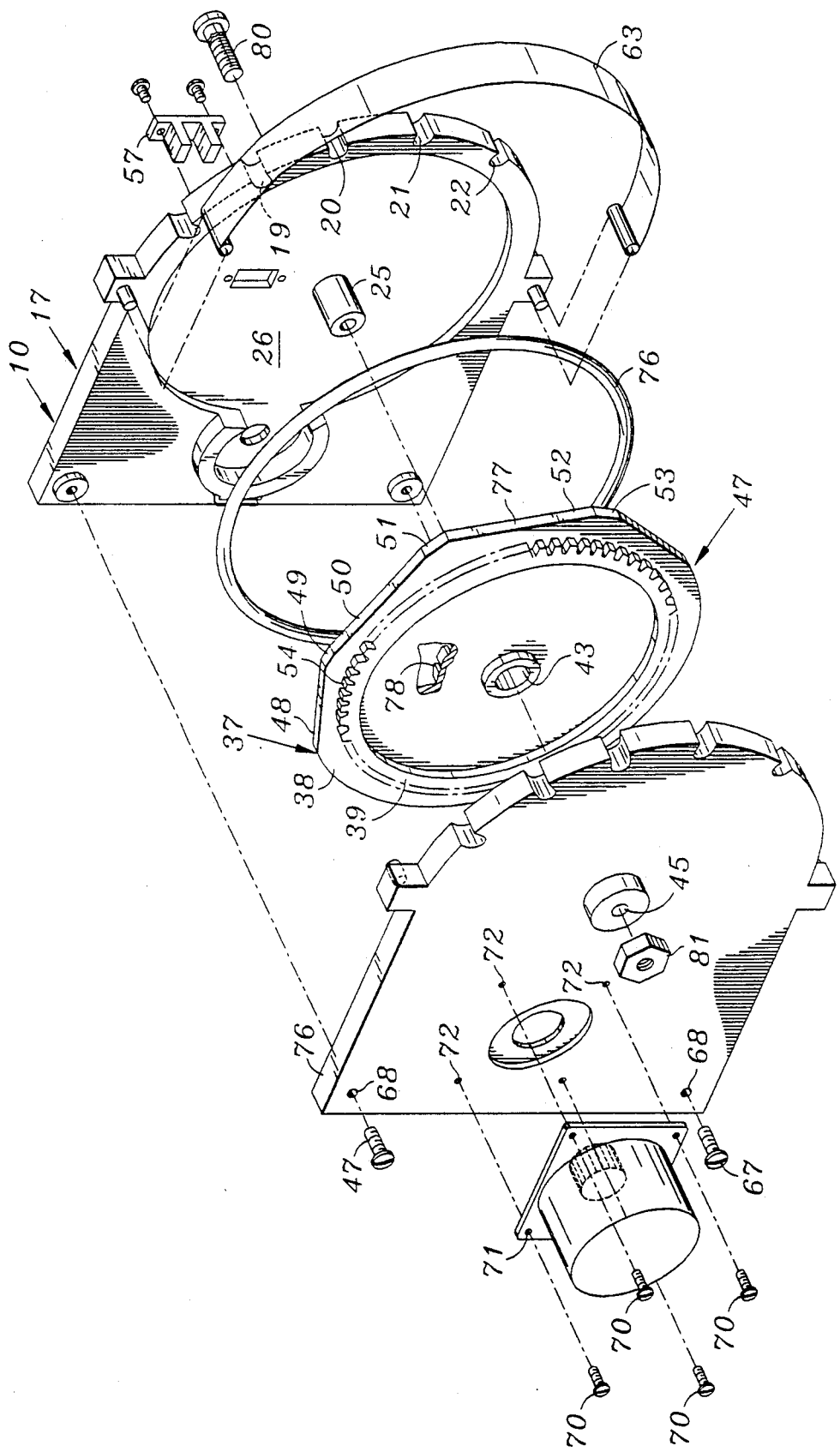
FIG. 7 is an exploded view of the housing of a different embodiment of the pinch valve in accordance with the invention.

As illustrated in FIGS. 5 and 7, a different embodiment is shown. In this case, instead of the plungers 34 constituting the movable means, this is constituted by an endless belt or hovering style element 76 which rides in a groove 77 about the periphery of the cam 38. The outside surface 78 of the belt 76 engages the conduits 11 through 16 and pinches them against the backing means 63. The endless belt 76 is clamped between stator 17 and motor mounting plate 46 so that it is restrained from rotation. To remove or replace the tubing 11 through 16, the backing means 63 needs to be loosened.

The flexible endless belt 76 can be made from a fluorocarbon compound or other low friction material. The belt 76 is likely stretched around the lobes 48 to 53 and other lobes of the cam 38 and is clamped between the stator 17 and the motor mounting plate 46. The lobes 48 through 53, etc. of the rotor 38 may have the recess or groove 77 in them so that the belt 76 does not slip off. As the rotor 37 rotates, it urges the belt 76 outwardly against the tubing 11 through 16 which pinches off to curb the flow of fluids. Since the belt 76 has a slippery surface and is restrained from moving relative to the rotor 37, it acts in the same manner as plungers 34 which prevents rubbing on and thus abrading the tubing 11 through 16.

An advantage of the belt 76 relative to the plungers 34 is that no sliding occurs with the belt 76. When the belt 76 passes over the cam lobes, it tends to return to the unstretched position completely disengaging from the tubing 11 through 16. The plungers 34 need to be able to slide freely in the housings 27 through 32 in the stator 17. Any contamination between the housings 27 through 28 and the plungers 34 can impede the sliding and thereby prevent the tubing 11 through 16 from opening fully.

In the embodiment illustrated in FIG. 5, the slotted optical switch 57 is located in the wall 26 constituting the stator 17. The notch flag 78 is part of the cam 38 of the rotor 37. The gear surface 39 is on the opposite side of the notched flag 79. As illustrated in FIG. 5, the shaft 25 is integrally molded as part of the stator 17. These characteristics are further illustrated in exploded view FIG. 7. A bolt 80 secures the centers of the stator 17 and mounting plate 46 by means of a nut 81.

All action is performed by a single cam 38 rather than by multiple cams. Tolerance variations are accordingly less critical than with prior art configurations where multiple cams and multiple components are needed for the pinch valve device.

Prior art devices require accurate matching of up to six cam segments and use a fixed backing means when the tubing 11 through 16 is pinched off. Adjustment of the fixed bar of the prior art with respect to the end of the plungers is accordingly very critical to obtain effective pinching off and release of the flexible conduits. The setting in the prior art devices must normally be within ±0.002 inches.

With the single cam device of the present invention and the use of the backing strap which is movable either as a compliant material or a stiff material anchored with spring anchorages, there is sufficient resistance in a radial direction to effect the pinching off of a predetermined number of tubes 11 through 16. No adjustment is therefore necessary. The cam lobes 48 through 53 and the additional lobes provide sufficient overtravel of the plunger 34 to ensure effective pinching of the tubes 11 through 16 over a wide tolerance range. The overtravel is taken out by the moveability of the backing strap 60.

With the pinch valve depicted utilizing 6 positions to operate 6 conduits 11 through 16 and by dividing the cam 38 into 16 positions at intervals of 22° 30′, the number of possible pumping combinations is either where there are three piston pumps having two ports each or, alternatively, a three-stage ratio pump.

Although the invention has indicated a pinch valve with six plungers and 16 positions, clearly many different combinations are possible. The cam lobes 48 through 53 and further lobes can be judiciously configured and the number of fluid lines 11 through 16 to one or more devices can be extended to any amount consistent with different applications.

The components can be made of multiple resins with acetal and teflon. This would reduce the number of parts as well as the complexity of the pinch valve device. The motor mounting plate 46 can be a sheet metal plate suitably punched or stamped or, alternatively, a molded plastic part. Since there are no bearings, the shaft 25 can be press-fitted into the stator 17.

The optical switch 57 can be constituted as an emitter/detector pair similar to an OPTEK OPB930W, Optek Technology, Inc., Carrollton, Tex. 75006, commonly used to indicate position.

Figure 8:
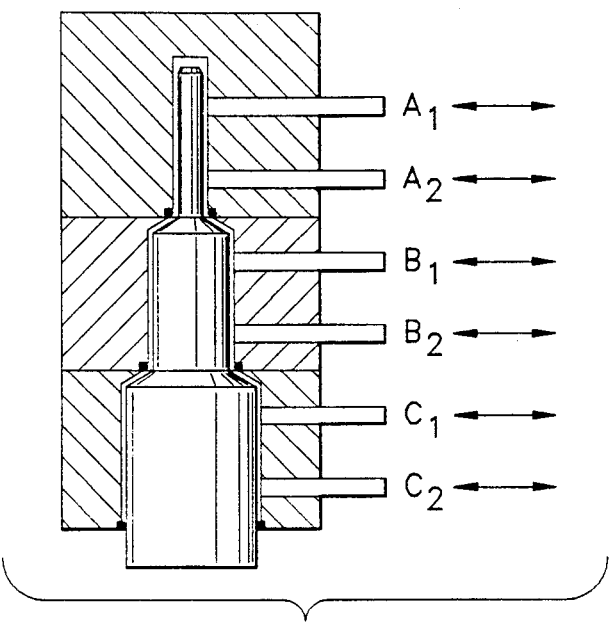
FIG. 8 is a diagrammatic view of a three-stage pump with two ports for each stage, the six conduits from the pinch valve being shown interacting with the pump.

In the following illustrative table, the various combinations for a three-stage pump are illustrated where the letter "C" illustrates a tube pinched position and the letter "O" represents a tube released or open position. Each stage of the three-stage pump has two ports as illustrated in FIG. 8. A rotor that implements the states in the following table is illustrated in FIG. 9. The rotor is illustrated in state 1 and rotation direction is illustrated by the CW and CCW arrows. Angular motion is relative with respect to the immediately preceding state.

TABLE I

| STATE | ANGULAR MOTION (RELATIVE) | PINCHING POSITIONS | | | | | |
|---|---|---|---|---|---|---|---|
| | | 11 | 12 | 13 | 14 | 15 | 16 |
| 1 | START | O | C | O | C | O | C |
| 2 | CCW 90° | O | C | O | C | C | O |
| 3 | CW 67.5° | C | O | C | O | C | O |
| 4 | CCW 157.5° | C | O | C | O | O | C |
| 5 | CCW 135° | C | O | O | C | O | C |
| 6 | CW 135° | C | O | C | O | O | C |
| 7 | CCW 90° | O | C | C | O | O | C |
| 8 | CW 180° | O | C | O | C | C | O |

C = TUBING PINCHED
O = TUBING OPEN

Many other examples of the invention exist, each differing from others in matters of details only. The scope of the invention is to be determined solely by the following claims.

What is claimed is:

1. A pinch valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, movable means cooperatively located with and activated by the actuator means for effecting selective pinching or releasing of the multiple selected fluid conduits including backing means mounted with the valve body and relatively with the fluid conduits such that the backing means is resistive when pinching is effected on up to a predetermined number of fluid conduits and wherein movement of the backing means is effected when pinching is effected on a number of fluid conduits greater than the predetermined number.

2. A pinch valve as claimed in claim 1 wherein the actuator means includes a cam, the cam having projecting portions for engaging the movable means thereby to effect pinching.

3. A valve as claimed in claim 2 wherein the projecting portions are multiple spaced lobes extending about the periphery of the cam, the lobes being a portion of the cam periphery.

4. A pinch valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, and movable means cooperatively located with and activated by the actuator means for effecting selective pinching or releasing of the multiple selected fluid conduits, wherein the valve body is a circumferential stator and wherein the actuator means is a circumferential rotor disposed within the stator.

5. A valve as claimed in claim 4 wherein the rotor includes a cam.

6. A pinch valve as claimed in claim 4 wherein the actuator means are a series of plungers located peripherally about the circumference of the stator, the plungers being movable between a first radial position wherein the fluid conduits are released and a second radial position where the fluid conduits are pinched.

7. A valve as claimed in claim 5 wherein the movable means is a belt, the belt being engageable with the cam such that when selected portions of the belt are in a first radial position, first selected conduits are pinched and when the selected portion of the belt is in a second radial position, the first selected conduits are released.

8. A valve as claimed in claim 7 wherein the belt is an endless loop, the belt being engageable over a periphery of the cam and the belt being relatively movable with the cam, such that as the cam rotates the interaction of the periphery of the cam causes selected portions of the belt to move between different radial positions.

9. A pinch valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, and movable means cooperatively located with and activated by the actuator means for effecting selective pinching or releasing of the multiple selected fluid conduits wherein the movable means are plungers arranged about a periphery of the valve body, the plungers being activated by the actuator means between a first position releasing the fluid conduits and a second position pinching the fluid conduits.

10. A pinch valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, and movable means cooperatively located with and activated by the actuator means for effecting selective pinching or releasing of the multiple selected fluid conduits and wherein the movable means is a belt engageable by the actuator means, the belt being movable between a first position wherein selected fluid conduits are released and a second position wherein selected fluid conduits are pinched.

11. A pinched valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, and movable means cooperatively located with and activated by the actuator means for effecting selective pinching or releasing of the multiple selected fluid conduits including backing means mounted with the valve body and relatively with the fluid conduits including backing means mounted with the valve body and relatively with the fluid conduits such that the backing means is resistive when pinching is effected on up to a predetermined number of fluid conduits and wherein the backing means is movable relative to the actuator means, the backing material being selectively a compliant material or a stiff material supported with compliant anchorages.

12. A pinched valve as claimed in claim 11 wherein the backing means is a strap, the strap being made selectively of plastic, rubber or urethane.

13. A valve as claimed in claim 12 wherein the backing means is a strap supported with spring anchorages relative to the actuator means.

14. A pinch valve as claimed in claim 13 wherein the spring anchorages are integrally formed with the strap.

15. A pinch valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, and movable means cooperatively located with and activated by the actuator means for effecting selective pinching or releasing of the multiple selected fluid conduits and wherein the actuator means includes a motor, the motor including a pinion for interacting with a rotor, thereby to effect rotation of the rotor.

16. A pinch valve as claimed in claim 15 wherein the rotor includes a gear for operative interaction with the pinion of the motor.

17. A pinch valve as claimed in claim 16 wherein the rotor includes a cam, the rotor and cam being integrally formed.

18. A pinch valve as claimed in claim 15 wherein the rotor includes a shaft for location with a stator, and wherein a gear, a cam and the shaft form an integral unit of the rotor.

19. A pinch valve as claimed in claim 15 wherein the rotor includes a cam and a gear, the cam and gear being constituted in two relatively parallel planes, the cam having an interactive periphery and the gear having teeth about its periphery, and wherein a shaft is directed centrally through the axis of the rotor.

20. A pinch valve as claimed in claim 19 including a flag element, the flag element being formed integrally with the cam and the gear.

21. A pinch valve as claimed in claim 20 wherein the flag element is a disk with at least one selected marker about the periphery of the disk, the gear cam and disk being substantially parallel to each other and in adjacent relationship.

22. A pinch valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, and movable means cooperatively located with and activated by the actuator means for effecting selective pinching or releasing of the multiple selected fluid conduits and wherein the valve body includes a stator, the stator having an element with circumferentially spaced slots, the slots being axially directed about the outside periphery of the stator, each slot being for accommodating a flexible fluid conduit, and wherein backing means is adapted to be located about the outside periphery of the stator with the flexible fluid conduits in the slots being between the stator and the backing means.

23. A pinch valve as claimed in claim 22 wherein the movable means are plungers and the stator includes radially directed housings for the plungers, the radially directed housings being located in alignment with the axially directed slots for the fluid conduits such that the plunger is movable in the housing between a first position at least partly removed from the slot and a second position at least partly across the slot thereby to effect pinching of the flexible conduits.

24. A pinch valve as claimed in claim 23, wherein the plungers are anvil-shaped, the anvil-shape having a stem and a head, the stem being for location in the housing, and the head being for interaction with the cam.

25. A pinch valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, and movable means cooperatively located with and activated by the actuator means for effecting selective pinching or releasing of the multiple selected fluid conduits including backing means mounted with the valve body and relatively with the fluid conduits such that the backing means is resistive when pinching is effected on up to a predetermined number of fluid conduits and wherein the actuator means includes a cam, the cam having projecting portions for engaging the movable means thereby to effect pinching and wherein the movable means is a flexible endless belt, the belt being selectively constituted by a fluorocarbon compound or low friction material, and wherein the belt is stretched about the periphery of the cam and is clamped relative to the valve body such that the belt is restrained from movement relative to the stator and is movable relative to the cam such that the belt interacts with the flexible tubing thereby to selectively pinch or release the fluid conduits.

26. A pinch valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, and movable means cooperatively located with and activated by the actuator means for effecting selective pinching or releasing of the multiple selected fluid conduits and wherein the actuator means includes a cam, the cam having a peripheral portion divided into sixteen circumferential sections, and wherein with six fluid conduits, the number of different release and pinching positions is eight and wherein the conduits are connected with three pump means, each pump means having two ports.

27. A pinch valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, and movable means cooperatively located with and activated by the actuator means for effecting selective pinching or releasing of the multiple selected fluid conduits including backing means mounted with the valve body and relatively with the fluid conduits such that the backing means is resistive when pinching is effected on up to a predetermined number of fluid conduits and wherein the backing means provides sufficient resistance in a direction against the pinching direction for effective pinching of a predetermined number of tubes and wherein the actuator means permits sufficient overtravel of the movable means to ensure effective pinching of the tubes, the overtravel being absorbed by the movement of the backing means after pinching of a predetermined number of fluid conduits.

28. A pinch valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, movable means cooperatively located with and activated by the actuator means for effecting selective pinching or releasing of the multiple selected fluid conduits, the actuator means including a single cam, the cam having projecting portions for engaging the movable means thereby to effect pinching, and wherein the projecting portions are multiple spaced lobes extending about the periphery of the cam, the lobes being a portion of the cam periphery, and backing means mounted with the valve body and relatively with the fluid conduits such that the backing means is resistive when pinching is effected on up to a predetermined number of fluid conduits and wherein the movable means are plungers arranged about a periphery of the valve body, the plungers being activated by the actuator means between a first position releasing the fluid conduits and a second position pinching the fluid conduits.

29. A pinch valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, movable means cooperatively located with and activated by the actuator means for effecting selective pinching or releasing of the multiple selected fluid conduits, the actuator means including a single cam, the cam having projecting portions for engaging the movable means thereby to effect pinching, and wherein the projecting portions are multiple spaced lobes extending about the periphery of the cam, the lobes being a portion of the cam periphery, and backing means mounted with the valve body and relatively with the fluid conduits such that the backing means is resistive when pinching is effected on up to a predetermined number of fluid conduits and wherein the movable means is a belt engageable by the actuator means, the belt being movable between a first position wherein selected fluid conduits are released and a second position wherein selected fluid conduits are pinched.

30. A pinched valve as claimed in claim 29 wherein the backing means is movable relative to the actuator means, the backing material being selectively a compliant material or a stiff material supported with compliant anchorages.

31. A pinch valve for selectively pinching or releasing a plurality of flexible fluid conduits comprising a valve body for retaining flexible fluid conduits, the valve body being a stator, actuator means including a rotor having an integrally formed cam and gear, the cam being cooperatively located with and movable relative to the stator thereby to permit selective pinching or releasing of multiple selected fluid conduits supported in the stator, movable means cooperatively located with and activated by the cam for effecting selective pinching or releasing of the multiple selected fluid conduits, the cam including projecting portions for engaging the movable means thereby to effect pinching, the projecting portions being multiple spaced lobes extending about the periphery of the cam, the lobes being a portion of the cam periphery, and wherein the backing means is mounted with the stator and relatively with the fluid conduits such that the backing means is resistive when pinching is effected.

32. A pinch valve as claimed in claim 31 wherein the movable means are plungers arranged about a periphery of the valve body, the plungers being activated by the actuator means between a first position releasing the fluid conduits and a second position pinching the fluid conduits.

33. A pinch valve for selectively pinching or releasing a plurality of flexible fluid conduits comprising a valve body for retaining flexible fluid conduits, actuator means cooperatively located with and movable relative to the valve body thereby to permit selective pinching or releasing of multiple selected fluid conduits, and movable means cooperatively located with and activated by the actuator means for effecting selective pinching or releasing of the multiple selected fluid conduits and wherein the movable means is a belt engageable by the cam, the belt being movable between a first position wherein selected fluid conduits are released and a second position wherein selected fluid conduits are pinched.

34. A valve as claimed in claim 33 wherein the belt is an endless loop, the belt being engageable over a periphery of the cam and the belt being relatively movable with the cam, such that as the cam rotates the interaction of the periphery of the cam causes selected portions of the belt to move between different radial positions.

35. A method for selectively pinching or releasing a plurality of flexible fluid conduits comprising retaining flexible fluid conduits in a stator, moving a rotor having a single cam relative to the stator thereby to facilitate in selected different positions the selective pinching or releasing of multiple selected fluid conduits by the cam in each different position.

36. A method as claimed in claim 35 including having an intermediate movable means cooperative with the cam for effecting selective pinching or releasing of the multiple selected fluid conduits.

37. A method as claimed in claim 36 wherein the intermediate movable means are plungers housed in the stator, and including moving the plungers between a first radial position and a second radial position at least partly beyond the stator thereby to effect pinching of the flexible conduits.

38. A method as claimed in claim 36 wherein the movable means is a flexible endless belt, and including stretching the belt about the periphery of the rotor and clamping the belt relative to the stator whereby the belt is restrained from movement relative to the stator and is movable relative to the rotor such that the belt interacts with the flexible tubing thereby to selectively pinch or release the fluid conduits.

* * * * *